US011107291B2

(12) United States Patent
Ishigaki et al.

(10) Patent No.: US 11,107,291 B2
(45) Date of Patent: Aug. 31, 2021

(54) TRAVERSING PHOTO-AUGMENTED INFORMATION THROUGH DEPTH USING GESTURE AND UI CONTROLLED OCCLUSION PLANES

(71) Applicant: GOOGLE LLC, Mountain View, CA (US)

(72) Inventors: Michael Ishigaki, San Jose, CA (US); Diane Wang, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/946,776

(22) Filed: Jul. 6, 2020

(65) Prior Publication Data

US 2021/0012572 A1 Jan. 14, 2021

Related U.S. Application Data

(60) Provisional application No. 62/873,012, filed on Jul. 11, 2019.

(51) Int. Cl.
*G06T 19/00* (2011.01)
(52) U.S. Cl.
CPC .................... *G06T 19/006* (2013.01)
(58) Field of Classification Search
None
See application file for complete search history.

(56) References Cited

U.S. PATENT DOCUMENTS

| 5,583,974 | A | * | 12/1996 | Winner | ................. | G06T 15/405 345/422 |
| 9,069,382 | B1 | | 6/2015 | Starner et al. | | |
| 10,181,218 | B1 | * | 1/2019 | Goetzinger, Jr. | ... | G06F 3/04815 |
| 2012/0001938 | A1 | | 1/2012 | Sandberg | | |
| 2013/0135180 | A1 | * | 5/2013 | McCulloch | ............ | G06Q 10/10 345/8 |
| 2013/0135295 | A1 | * | 5/2013 | Li | ........................ | G06F 3/04883 345/419 |
| 2013/0249947 | A1 | * | 9/2013 | Reitan | ..................... | G06F 3/011 345/633 |

(Continued)

FOREIGN PATENT DOCUMENTS

WO 2018118657 A1 6/2018

OTHER PUBLICATIONS

Extended European Search Report for European Application No. 20184992.4, dated Nov. 19, 2020, 9 pages.

*Primary Examiner* — Robert J Craddock
(74) *Attorney, Agent, or Firm* — Brake Hughes Bellermann LLP

(57) ABSTRACT

Systems and methods are described that obtain depth data associated with a scene captured by an electronic device, obtain location data associated with a plurality of physical objects within a predetermined distance of the electronic device, generate a plurality of augmented reality objects configured to be displayed over a portion of the plurality of physical objects, and generate a plurality of proximity layers corresponding to the at least one scene, wherein a respective proximity layer is configured to trigger display of the auxiliary data corresponding to AR objects associated with the respective proximity layer while suppressing other AR objects.

18 Claims, 12 Drawing Sheets

(56) References Cited

U.S. PATENT DOCUMENTS

| | | | |
|---|---|---|---|
| 2013/0293468 A1* | 11/2013 | Perez | G06F 21/32 |
| | | | 345/158 |
| 2013/0293585 A1 | 11/2013 | Sudou | |
| 2017/0039770 A1* | 2/2017 | Lanier | G06T 19/006 |
| 2018/0045963 A1* | 2/2018 | Hoover | H04N 13/395 |
| 2019/0019011 A1* | 1/2019 | Ross | G06T 19/006 |
| 2019/0107935 A1* | 4/2019 | Spivack | G06T 13/40 |

\* cited by examiner

700

Obtain depth data associated with at least one scene captured by the electronic device  702

Obtain location data associated with a plurality of physical locations or physical objects within a predetermined distance of the electronic device  704

Obtain auxiliary data associated with at least a portion of the physical locations or physical objects within the predetermined distance of the electronic device  706

Generate a plurality of augmented reality (AR) objects  708

Generate a plurality of proximity layers corresponding to the at least one scene  710

Detect indication of traversing scene?  712

N → Retain current proximity layer view  714

Y → Trigger display of auxiliary data corresponding to AR objects associated with proximity layer triggered by the detected indication  716

FIG. 7

TRAVERSING PHOTO-AUGMENTED INFORMATION THROUGH DEPTH USING GESTURE AND UI CONTROLLED OCCLUSION PLANES

CROSS-REFERENCE TO RELATED APPLICATION

This application claims the benefit of U.S. Provisional Application No. 62/873,012, titled TRAVERSING PHOTO-AUGMENTED INFORMATION THROUGH DEPTH USING GESTURE AND UI CONTROLLED OCCLUSION PLANES, and filed on Jul. 11, 2019, the disclosure of which is incorporated by reference herein in its entirety.

TECHNICAL FIELD

This disclosure relates to Augmented Reality (AR) experiences and content depicted in user interfaces of two-dimensional (2D) screens.

BACKGROUND

In the context of computer-based consumption of media and other content, it is becoming increasingly common to provide a user (viewer, participant, etc.) with immersive experiences. One field involves the presentation of virtual reality (VR) and/or augmented reality (AR) environments on a device, such as a smartphone or a tablet. In an AR environment, a user can watch a screen that presents at least both an aspect of a physical environment (e.g., a video or real-time image of a physical space) and an aspect of AR/VR (e.g., a virtual object superimposed on the video or image) to provide an AR experience.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method for providing an augmented reality (AR) experience on an electronic device includes at least one processing device and memory storing instructions that when executed cause the processing device to perform operations including obtaining depth data associated with at least one scene captured by the electronic device, obtaining location data associated with a plurality of physical objects within a predetermined distance of the electronic device, generating a plurality of augmented reality (AR) objects configured to be displayed over (and/or in conjunction with) the portion of the plurality of physical objects in the at least one scene, and generating a plurality of proximity layers corresponding to the at least one scene.

In some implementations, a respective (e.g., target) proximity layer is configured to trigger display of the auxiliary data corresponding to AR objects, in the plurality of AR objects, associated with the respective (e.g., target) proximity layer while suppressing AR objects, in the plurality of AR objects, associated with other proximity layers, in response to detecting an indication on the electronic device to traverse (e.g., navigate through, move within, and/or otherwise travel across or through) the at least one scene toward at least one of the plurality of AR objects associated with the respective (e.g., target) proximity layer.

For example, the systems and methods described here can detect an indication on the electronic device to move within the at least one scene toward at least one of the plurality of AR objects associated with a target proximity layer and in response to the detecting, the systems and methods can trigger display in the target proximity layer, auxiliary data corresponding to AR objects, from the plurality of AR objects, associated with the target proximity layer while suppressing display of AR objects, from the plurality of AR objects, associated with other proximity layers.

Implementations may include one or more of the following features. In some implementations, each AR object is configured to provide access to a version of the location data and the auxiliary data corresponding to the respective physical object in the portion. In some implementations, each AR object in the plurality of AR objects represents an affordance configured to retrieve and provide the version of the location data and the auxiliary data associated with each physical object or physical location.

In some implementations, the method includes generating the plurality of proximity layers which includes determining a distance between each AR object, and distributing each AR object into one of the plurality of proximity layers based on the determined distance and the depth data associated with the at least one scene. In some implementations, the respective (e.g., target) proximity layer is further configured to trigger display of the auxiliary data corresponding to the AR objects associated with the respective (e.g., target) proximity layer while suppressing AR objects associated with other proximity layers, in response to detecting the electronic device is moved to a location within a threshold distance from at least one of the AR objects associated with the respective (e.g., target) proximity layer.

In some implementations, the AR objects associated with other proximity layers are depicted in a collapsed state when suppressed and the AR objects associated with the respective (e.g., target) proximity layer are depicted in an expanded state when triggered for display. In some implementations, the respective (e.g., target) proximity layer is indicated as active when triggered to display the auxiliary data corresponding to the AR objects, the respective (e.g., target) proximity layer being further associated with an occlusion plane configured to apply a reductive visual treatment to one or more AR objects in a portion of the other proximity layers that are located in a foreground between the occlusion plane and a camera of the electronic device. In some implementations, at least a portion of the AR objects in a proximity layer of the plurality of proximity layers are determined to be at a different depth in the scene than other of the AR objects distributed in the same proximity layer.

In some implementations, generating the plurality of proximity layers further includes determining an overlap in two or more of the plurality of AR objects, distributing the overlapped two or more of the plurality of AR objects into a single proximity layer in the plurality of proximity layers, and adjusting placement of the two or more of the plurality of AR objects when the single proximity layer is indicated as active and the two or more of the plurality of AR objects are simultaneously triggered for display.

Implementations of the described techniques may include hardware, a method or process, computer program products, or computer software on a computer-accessible medium.

The details of one or more implementations are set forth in the accompanying drawings and the description below.

Other features will be apparent from the description and drawings, and from the claims.

BRIEF DESCRIPTION OF THE DRAWINGS

FIG. 7 is a flow chart diagramming an implementation of a process to generate a plurality of UI layers to provide an augmented reality (AR) experience, in accordance with implementations described herein.

The use of similar or identical reference numbers in the various drawings is intended to indicate the presence of a similar or identical element or feature.

DETAILED DESCRIPTION

Figure 1:
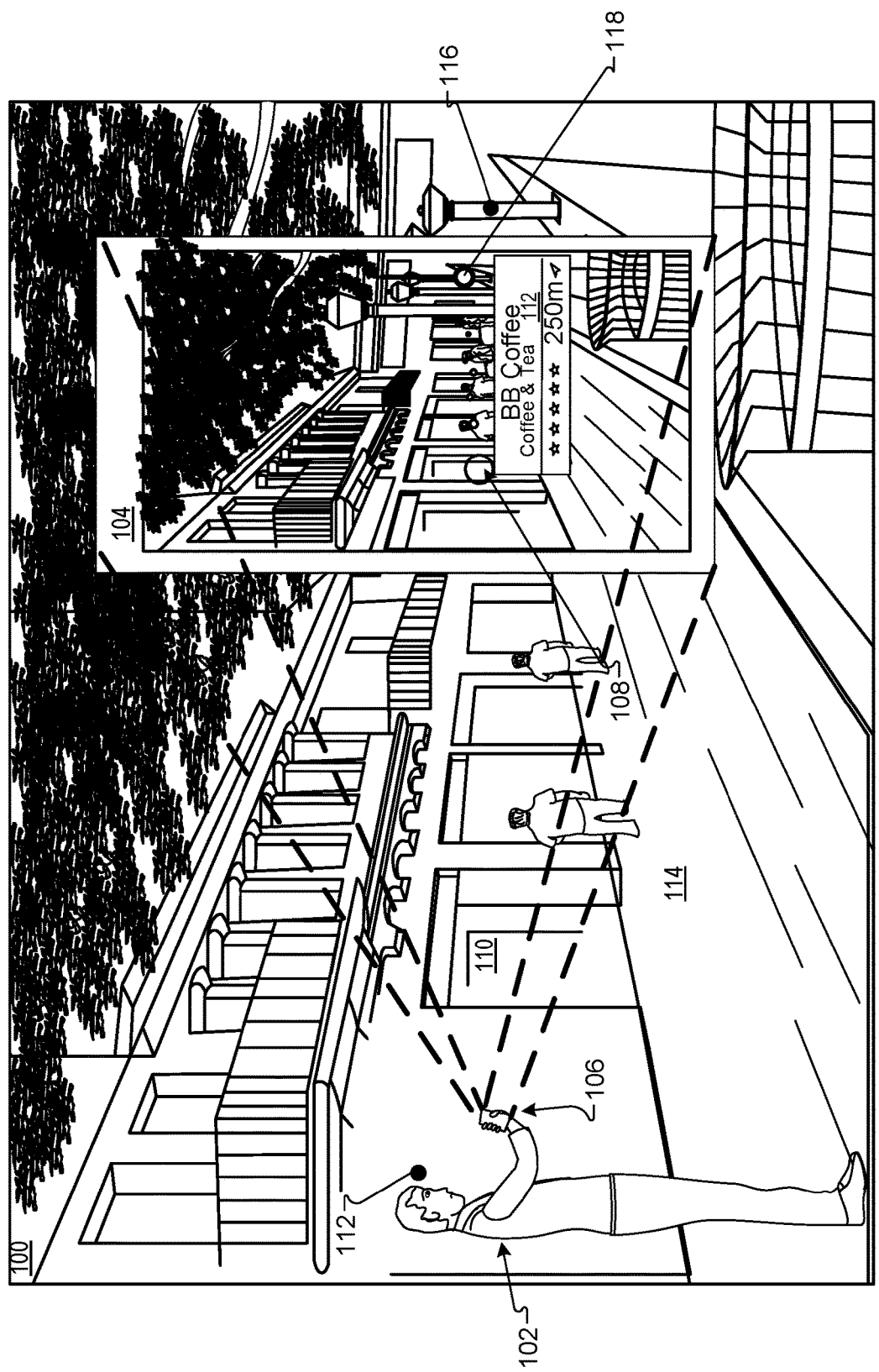
FIG. 1 is a third person view of an example physical space in which a user is experiencing an augmented reality (AR) environment on a mobile device, in accordance with implementations described herein.

In augmented reality depicted on two-dimensional (2D) screen devices, user interface density can be affected by both crowding on the 2D plane as well as crowding in depth of the AR interface. For example, content, objects, and information presented in close proximity (e.g., near, proximate, overlaid, covering, overlapped, etc.) to other content, objects, or information may be considered crowded (e.g., depth-dense) content in an AR interface. The depth crowding can make it difficult for a user to select any of the content, objects, or information without inadvertently selecting other elements in the AR interface. For example, this depth crowding can cause difficulty for a user attempting to access content and/or otherwise interact with elements in depth-dense AR interfaces. In order to provide easily viewable and accessible content, objects, and information in a depth-dense AR interface, the systems and techniques described herein may provide a hierarchical AR interface (or other user interface) with a gesture-based system for traversing (e.g., navigating, scrolling, accessing) depth-dense AR experiences.

In general, this document describes example systems and techniques for providing interaction with user interface (UI) elements using a layered architecture to assist with user access and selection of densely populated augmented reality (AR) content associated with physical objects and locations in the physical space. As technologies improve to provide access to photo-augmented information quickly, the UI architecture described herein will improve the user-facing experience to allow for intuitive access to all available information associated with UI elements (e.g., of an AR interface) corresponding to the physical objects and locations in the physical space.

In general, the UI architecture described herein may ensure that densely populated AR content is assigned to layers in order to allow clear presentation and user access to the AR content. In particular, the layered architecture may strategically organize AR content associated with a particular physical space (e.g., scene) in a number of stacked planes of content according to proximity of the user to the particular AR content in the physical space. The strategic organization may include generating photo-augmented information (e.g., AR content and camera feed of the physical environment) that is layered in stacked planes.

The stacked planes may include layers of UI elements that may be accessed according to the proximity of a user (or mobile device) to the physical objects and locations in the physical space. For example, the systems and techniques described herein may provide access to the UI elements on a two-dimensional (2D) screen of an electronic device (e.g., a mobile device) using the layered architecture to present the AR content as the user approaches particular physical objects or locations associated with the UI elements. In some implementations, the user may pinch and/or scroll to indicate movement on the screen of the electronic device toward particular representations of the physical objects or locations, which may trigger the architecture described herein to display (or cease display of) UI elements. The distance from the user (or device) to the physical objects or locations may be configured, according to the layered architecture, to trigger display of the AR content at an appropriate threshold distance.

The layered architecture of UI elements can provide the advantage of allowing a user to intuitively access AR content associated with each UI element depicted on the mobile device through the AR experience as the user approaches one or more UI elements corresponding to respective physical objects and/or locations. For example, the systems and techniques described herein may organize the UI elements that overlap or otherwise cluster in the UI to unfold content associated with the UI elements at a precise proximity detection. The organization of the UI elements may be in a layered fashion based on a proximity of the physical object or location to the user accessing the AR experience on the mobile device, for example. Such layers may be defined as proximity layers configured by the architecture described herein to categorize the UI element according to the determined proximity of the user (or mobile device) to the physical location and/or object.

For example, when the user approaches a physical object or location associated with a number of layered UI elements, the systems and techniques described herein may retrieve or access one or more proximity layers to begin displaying AR content to the user as the user moves through the physical space. UI elements that are near (e.g., within close proximity) to the user may be triggered to display corresponding AR content on the mobile device near or overlaid on the physical object or location. UI elements that are farther from the user are categorized into different proximity layers and thus may not be displayed (e.g., may be suppressed from display) until the user approaches a physical object or location associated with such UI elements. In some implementations, as the user moves away from particular UI elements, those UI elements are collapsed and removed from display while different UI elements may be displayed in the mobile device as the user approaches new physical locations or objects associated with the different UI elements.

As used herein, a UI element may represent an AR object presented to offer one or more other UI elements, AR content, services, and/or operational elements to a user accessing the AR environment depicting the UI element. In some implementations, the UI element representing the AR object may be referred to as a gleam, a dot, an affordance, and the like. Any shape or object may represent a UI element including both visible and invisible elements.

As used herein, a UI element or AR content that is provided to the user may include displaying such elements or content to the user on a mobile device. The display of the elements or content may be displayed in part or in full. In some implementations, the elements and/or content may be displayed as an overlay (i.e., covering in full, partially, or in transparency) located on top of an object or location in the scene corresponding to the elements and/or content.

In general, the implementations described throughout this disclosure may augment camera-based experiences with high-density information (e.g., selectable and interactable UI elements) which can be organized using the proximity layer architecture and accessed by a user as the user moves through a physical space associated with an AR scene. The proximity layer architecture may provide an unfolding UI hierarchy that is pinned in world-space (e.g., the physical space).

In some implementations, the systems and methods described herein may allow any number of processes to participate in generating and placing UI content/UI elements for a scene (in an AR environment). Unlike conventional AR systems that rely on applications to provide and place UI elements, the systems (e.g., framework) and methods described herein utilize a framework that may use proximity layers executing on an AR computing device to mediate and generate affordances for suggesting and placing UI elements within one or more scenes in the AR environment.

FIG. 1 is a third person view of an example physical space 100, in which a user 102 is experiencing an augmented reality (AR) environment shown in a scene 104 through a display of a mobile device 106. The scene 104 as viewed through the display of the mobile device 106 is shown in an expanded view within this figure to facilitate the description. The scene 104 can be generated by an AR application (FIG. 2) and displayed to the user 102 through the mobile device 106, or other device. The scene 104 includes a camera feed of a number of physical elements shown in the physical space 100 (e.g., trees, doors, balconies, etc.). The scene 104 also includes an AR object 108 (e.g., content represented as a UI element) that is displayed over an image of the physical space 100. In some implementations, the AR object 108 may be displayed in conjunction with an image of the physical space 100. In this example, the AR object 108 is a UI element on a representation of an object 110 (e.g., a door) in the physical space 100, which is depicted on the same door represented in the scene 104 of an AR environment. Other objects and UI elements are possible. Here, the scene 104 is displayed on an electronic device (e.g., mobile device 106). In general, the scene 104 may represent a portion of the physical space 100 that is captured within a field of view of the imaging device of the mobile device 106. The user is shown at position 112.

As shown in FIG. 1, the user 102 may have accessed the mobile device 106 and began an AR experience. The user 102 may begin to walk, turn toward, or otherwise view new locations and objects in the physical space. As the user moves nearer to particular locations and objects, UI elements may be triggered and new AR content may be depicted in the scene 104. Since the user at position 112 is nearing object 110 (e.g., the door), the systems and techniques described herein may trigger display of AR content associated with object 110. For example, a UI element associated with object 110 may be arranged in a proximity layer that triggers display of the AR object 108 upon detecting proximity of the user to the object 110. AR object 108 indicates that the door associated with object 110 is a business named BB Coffee which serves coffee and tea. In addition, the AR object 108 indicates a rating for the business, a distance indicating the mobile device 106 distance to the business and a direction to follow to find the business. Other content may be displayed and any or all content may be depicted in any shape, form, and size.

In the above example, if the user 102 continues to walk down the sidewalk 114, additional UI elements may be triggered to display additional AR content (not shown). For example, if the user walks to or near location 116, corresponding to UI element 118 in the scene 104), additional information pertaining to location 116 may be provided (e.g., displayed) to the user because the user may have triggered a different proximity layer as the user brings the mobile device 106 closer to location 116. In addition, the proximity layer that triggered AR object 108 may be triggered to hide AR object 108 once a user moves a further distance from object 110. In this fashion, proximity layers may be expanded and collapsed according to detected user/device proximity to UI elements associated with objects or locations in the physical environment.

Although many of the examples described herein are described in terms of placement of the AR content, such placement of the AR content providing UI elements/UI content can include initial placement, tracking, movement, and/or so forth of the AR content. In some implementations, initial placement can be performed using particular relationships and/or rules. In some implementations, initial or updated placement of AR content may be automated or may be user-input based including, but not limited to dragging, tap-to-place, and/or so forth.

Figure 2:
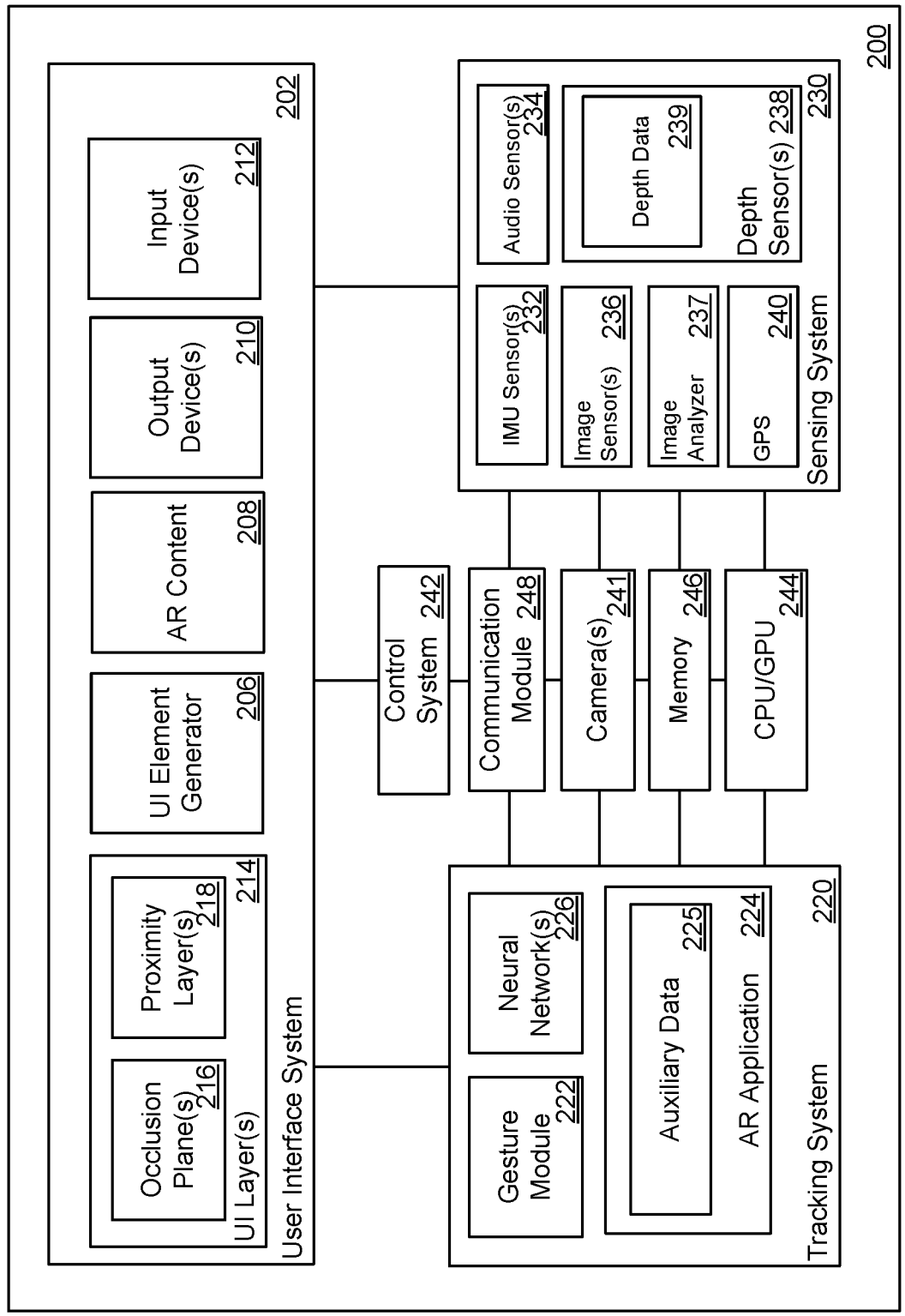
FIG. 2 is a block diagram of an example hierarchical user interface (UI) and gesture-based system for traversing depth-dense AR experiences, in accordance with implementations described herein.

FIG. 2 is a block diagram of an example hierarchical user interface (UI) and gesture-based system 200 for traversing depth-dense augmented reality (AR) experiences, in accordance with implementations described herein. The system 200 may be (or have access to) an electronic device that can generate an augmented reality (or mixed reality) environment and provide layered UI elements as the user approaches particular locations or objects in the physical space. In some implementations, the system 200 is a mobile device operated by a user in the physical space. The mobile device may be used by a user accessing content (e.g., virtual content provided from a server over a network, for example. Accessing content with the mobile device may include generating, modifying, moving and/or selecting AR content, virtual reality (VR) content, and/or mixed-reality MR content from a server device, from a local memory on the mobile device, or from another device connected to or having access to a network accessible to system 200.

As shown in FIG. 2, the mobile device (e.g., system 200) includes a user interface system 202. The user interface system 202 includes at least UI element generator 206, AR content 208, output devices 210, input devices 212, and UI layers 214. In general, the UI element generator 206 may generate UI layers including, but not limited to occlusion planes 216 and proximity layers. In addition, the UI element generator 206 may generate and configure UI elements (e.g., AR content, gleams, affordances, data, button, graphic, animation, image, video, etc.) for display on an electronic device.

In some implementations, the UI element generator 206 generates UI elements as a particular shape, object, gleam, affordance, dot, pixels, etc. In some implementations, the UI element generator 206 may generate a larger shape for a UI object for proximity layers and objects that are closer to the user. Similarly, the UI element generator 206 may generate a smaller shape for a UI object for proximity layers and objects that are farther from the user. In this fashion, the user may differentiate between UI elements that are closer and UI elements that are farther from the user.

The UI element generator 206 may generate UI elements in a similar size and shape depending on which proximity layer the UI elements reside within. For example, the UI element generator 206 may generate a larger circle for any UI elements in an active proximity layer. The UI element generator 206 may then generate a smaller circle for any UI elements in an inactive proximity layer. The user may select either sized circle, but may be afforded an improved view of the scene because UI elements in the distance are sized smaller indicating that those UI elements are farther from the user than other larger UI elements.

The UI layers 214 may include occlusion planes 216 and proximity layers 218. Other layers are of course possible. As used herein, an occlusion plane 216 represents a software construct that functions to cull (e.g. hide or remove) or otherwise visually diminish a foreground associated with a UI element and/or to hide the UI element and AR content associated with the UI element. In some implementations, the occlusion plane functions to hide UI element within an active proximity layer. In some implementations, the occlusion plane functions to hide all UI elements that are not in an active proximity layer. Thus, AR content defined to be behind an occlusion plane will not render to the user unless the user and/or device associated with an AR experience triggers removal or modification of the occlusion plane.

In some implementations, the occlusion planes 216 is configured to apply a reductive visual treatment to one or more AR objects in inactive proximity layers that are located in a foreground between a particular occlusion plane 216 and the camera of the mobile device 106.

The proximity layers 218 represent a number of planes that define available UI elements in a scene. A proximity layer can be either active or inactive. In some implementations, the UI elements of a particular scene are scattered amongst the proximity layers 218. Upon a user (or electronic device) approaching within a particular proximity of a UI element in a proximity layer, the proximity layer may become active. Active proximity layers may present information associated with UI elements in the active proximity layer. Inactive proximity layers may not present information associated with the UI elements in such layers. The UI elements can have a collapsed state or an expanded state. At any given moment, each UI element in the active proximity layer may be expanded while each of the UI elements in the inactive proximity layers remain collapsed.

The AR content 208 may include audio/video signals that are streamed or distributed to one or more computing devices. The AR content 208 may also include (or be retrieved from) the AR application 224 and/or other applications and algorithms that run (execute) on the system 200 to generate 3D scenes, audio signals, and/or video signals. The AR content 208 may be distributed or sent to one or more computing devices, such as the mobile device 106. In an example implementation, the AR content 208 and/or auxiliary data 225 includes three-dimensional scenes, facts, executable content, reviews, address details, time-based listings, book passages, reference material, and/or images, video, and other interactive content.

In some implementations, the AR application 224 may provide auxiliary data 225 within or associated with the provision of the AR content 208. In some implementations, the auxiliary data 225 is the AR content 208. Auxiliary data 225 may represent non-location data displayed to the user at a time indicated by the system 200 based on the proximity layers 218 defined for a particular scene. Auxiliary data 225 may represent data provided by a third party information provider via AR application 224. For example, auxiliary data 225 may include advertisements, facts, executable content, instructions, directions, and/or options, any and all of which may be provided from a third party information provider. Auxiliary data 225 may represent data collected from the Internet about the physical location or physical object. In some implementations, the auxiliary data 225 may represent information collected from reputable online sources. Auxiliary data 225 may represent previous data accessed by the user on mobile device 106 Auxiliary data 225 may represent information gathered via artificial intelligence algorithms using deep machine learning and/or neural networks 226 to generate and offer actionable options to a user accessing mobile device 106.

The output device 210 may include, for example, a display for visual output, a speaker for audio output, and the like. The input devices 212 may include, for example, a touch input device that can receive tactile user inputs, a microphone that can receive audible user inputs, and the like.

The system 200 also includes a tracking system 220. The tracking system 220 may track user movements, mobile device movements, and/or VR/AR object movements in the AR environment. The tracking system 220 includes at least a gesture module 222, an AR application 224, and may utilize neural networks 226, for predicative tracking and the like.

The neural networks 226 may include detectors that operate on images to compute, for example, face locations to model predicted locations of the moving user as the user moves in the physical space. Such networks 226 may be used to place AR/MR content with respect to a moving user captured in a camera feed, for example. In some implementations, the neural networks 226 are not used by system 200.

The system 200 also includes a sensing system 230. In operation, a mobile device (e.g., operating the system 200) may also include any number of sensors and/or devices. For example, the mobile device may include (or have access to), for example, light sensors, inertial measurement unit (IMU) sensors 232, audio sensors 234, image sensors 236, image analyzer 237, depth sensors 238 (e.g., generating depth data 239), cameras, distance/proximity sensors (not shown), positional sensors (not shown), and/or other sensors and/or different combination(s) of sensors. Some of the sensors included in the system 200 may provide for positional detection and tracking of the mobile device. Some of the sensors of system 200 may provide for the capture of images of the physical environment for display on a component of the user interface system 202.

The IMU sensor 232 may function to detect, for the mobile device, a 3D orientation in 3D space based on the measurements taken by the IMU sensor 232. The IMU sensor 232 may include one or more accelerometers, gyroscopes, magnetometers, and other such sensors. In general, the IMU sensor 232 may detect motion, movement, velocity, and/or acceleration of the mobile device, for example. In some implementations, a pose of the mobile device 106, for example, may be detected based on data provided by the IMU sensor 232. Based on the detected pose, the system 200 may update content depicted in the screen of mobile device to reflect a changed pose of the mobile device as the device is moved, for example.

The image sensors 236 may detect changes in background data associated with a camera capture. The cameras 241 may include a rear-facing capture mode and a front-facing capture mode. The front-facing capture mode may capture the user including any background scenery. The system 200 may be used to detect movement and provide particular UI elements as the user moves with mobile device and to properly depict AR content in a location corresponding to the movements.

The AR application 224 may use the image analyzer 237 and/or an image buffer (not shown) to generate images for display on the mobile device based on the AR content 208. For example, one or more images captured by the cameras 241 may be stored in the image buffer for user in placing image content and/or AR content within the captured and stored images. The image analyzer 237 may determine various properties of the image, such as the location of objects and UI surfaces upon which the AR content may be positioned. In some implementations, the image analyzer 237 may analyze an image captured by cameras 241 as a basis for searching and obtaining additional related information to data represented by the captured image. Such related information can be utilized by system 200 to provide relevant facts, media, and other UI content associated with particular objects presented in the AR environment.

The depth data 239 may be captured by one or more depth sensors 238. The depth sensors 238 may capture depth data to be used in 3D presentation of AR content on mobile device 106, for example. Such depth sensors 238 can be considered part of a depth capturing component in the sensing system 230 along with the AR application 224 to be used for characterizing the scenes captured by the cameras 241 in order to correctly represent them on a 3D display. The tracking system 220 can track the position and orientation of the users head so that the 3D presentation can be rendered with the appearance corresponding to the user's current point of view.

Any of multiple types of depth sensing or depth capturing can be used for generating depth data 239. The detected signal(s) associated with captured content from the camera 241 can be processed to generate depth data 239 corresponding to some or the entire scene. The depth data 239 may be used to assess which proximity layer in which to place UI elements (e.g., gleams, AR content, affordances, etc.).

Depth data 239 can include or be based on any information regarding a scene that reflects the distance between a depth sensor (e.g., the depth sensor 238) and an object in the scene. The depth data 239 reflects, for content in an image corresponding to an object in the scene, the distance (or depth) to the object. For example, the spatial relationship between the camera(s) 241 and the depth sensor 238 can be known, and can be used for correlating the images captured by the camera(s) 241 with signals from the depth sensor 238 to generate depth data 239 for the images, scenes, and/or camera feed.

The GPS 240 may provide global positioning detection for the mobile device 200. The location of the user may be determined using GPS 240. The locations surrounding a user in scenes and beyond the scenes may be determined via GPS 240. AR application 224 may provide AR content based on data retrieved via GPS 240.

The system 200 (operating on mobile device 106) may also include a control system 242. The control system 242 may include, for example, a power control device, audio and video control devices, an optical control device, and/or other such devices and/or different combination(s) of devices.

The user interface system 202, the tracking system 220, the sensing system 230, and/or the control system 242 may include more, or fewer, devices, depending on a particular implementation, and each of these systems may have a different physical arrangement than shown in FIG. 2. The system 200 may also include one or more processors (e.g., CPU/GPU 244 in communication with the systems 202, 220, 230, and/or 242, memory 246, cameras 241, and a communication module 248. The communication module 248 may provide for communication between the mobile device (operating the system 200) and other external devices. Processors 244 are configured to execute instructions (e.g., computer programs) in order to carry out specific tasks. In some implementations, at least one of the processors 244 executes instructions to expose the interactivity of depth-dense UI elements in usable slices that may be collapsed and expanded according to user/device proximity to corresponding physical world locations and/or objects. Memory 246 may be utilized throughout communications and interactions amongst the components in system 200.

In addition, the system 200 may use or have access to one or more VR/AR/MR peripherals (not shown). Example peripherals may include any number of controllers, computing devices, head-mounted display devices, cameras, speakers, tracking systems, and/or other device in communication with system 200.

In operation, system 200 can be configured to display UI elements over (e.g., on, overlaid upon, or in conjunction with, etc.) their associated real-world objects and/or locations in the physical space in a live camera feed from an AR-enabled device, such as mobile device 106. These real-world objects and/or locations may then be categorized by the system 200 into proximity layers. Such layers are expanded or collapsed by system 200 as the mobile device 106 is brought nearer to or farther from each respective real-world object and/or location in the physical space. Thus, system 200 exposes the interactivity of depth-dense UI elements in usable slices (i.e., using the proximity layer architecture). The slices may be displayed to the user in a way which is visually and gesturally intuitive, thereby providing an advantage over conventional systems that provide AR content. This advantage enables users to access the full interactivity afforded by the AR experience in a usable manner, without the AR experience having to be reductive in the capability it affords to users.

Figure 3:
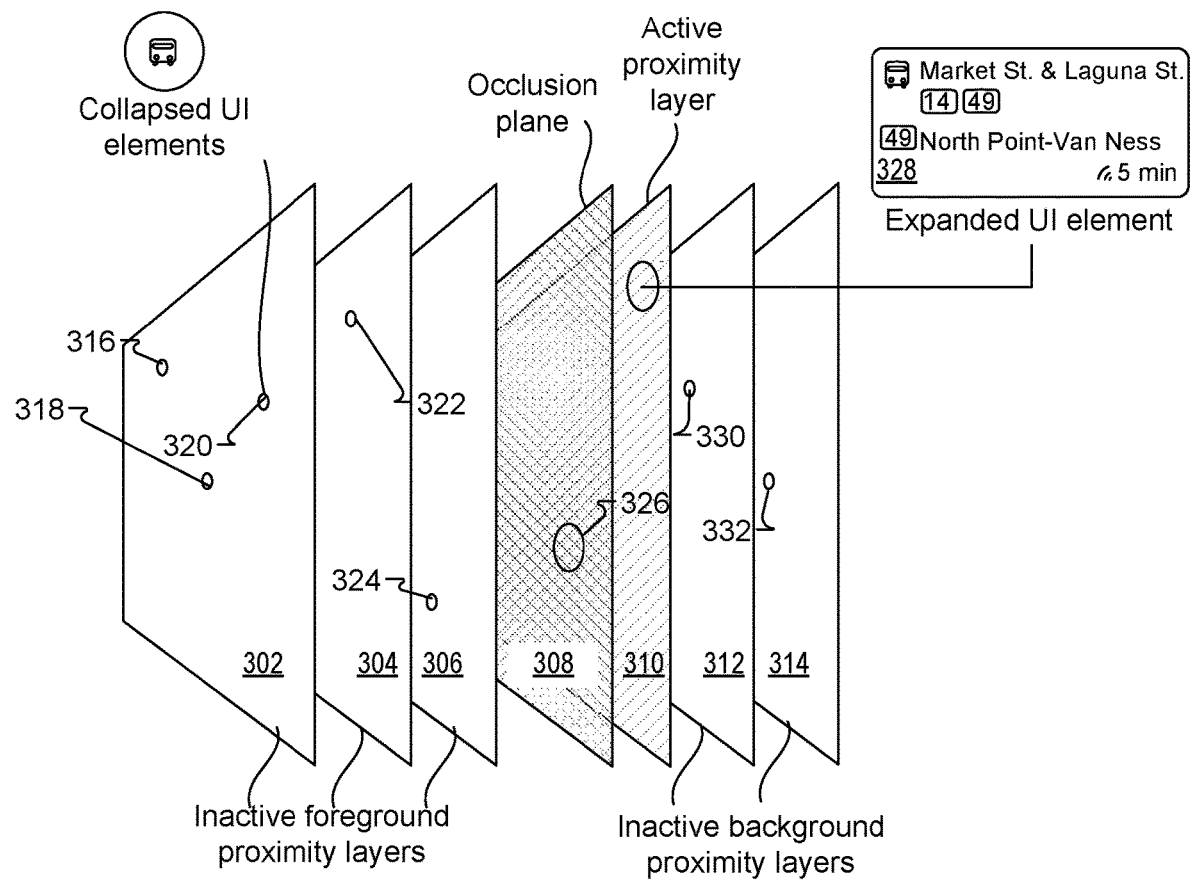
FIG. 3 is an example diagram illustrating presentation of UI elements in a number of layers, in accordance with implementations described herein.

FIG. 3 is an example diagram illustrating presentation of UI elements in a number of, layers in accordance with implementations described herein. In general, the UI elements in a particular proximity layer may not be strictly coplanar but may be closely related in depth by a predefined tolerance. The tolerance may be system-defined, user-defined, application-defined, and/or otherwise programmable.

In some implementations, the UI elements in the closest proximity layer (to the device of the user) begins expanded while further proximity layers begin collapsed. Active proximity layers may have an occlusion plane preceding the active proximity layer. For example, in the stack up of FIG. 3, the occlusion plane 308 precedes active proximity layer 310. Other stack up directions and layouts are possible. The occlusion plane may either cull or apply a reductive visual treatment to all UI elements in proximity layers in the foreground that come between the occlusion plane and the camera, for example.

The layers shown here include a proximity layer 302, a proximity layer 304, a proximity layer 306, an occlusion plane 308, a proximity layer 310, a proximity layer 312, and a proximity layer 314.

The layers 302-314 can be collapsed, expanded, inactive, active, foreground, and/or background. As shown, the proximity layer 302 is an inactive foreground proximity layer that includes a number of collapsed UI elements. For example, collapsed UI elements include UI element 316, UI element 318, and UI element 320. The UI elements 316, 318, and 320 may have been collapsed and organized into the same proximity layer 302 by system 200 based on a detected distance from one another. For example, system 200 may determine that particular UI elements should be grouped based on a predefined tolerance or threshold distance between elements.

As shown in FIG. 3, proximity layers 304 and 306 represent inactive foreground proximity layers that include a UI element 322 and a UI element 324, respectively. Each of UI elements 316, 318, 320, 322, and 324 are collapsed UI elements that would be hidden to a user until the user approaches objects or locations in the physical space that are associated with each respective (e.g., target) proximity layer 302-306. The inactive foreground proximity layers 302-306 may have different visual appearances and/or treatment than inactive background proximity layers. For example, an inactive proximity layer may include UI elements that are invisible (or a few pixels in size). In another example, an inactive proximity layer may include UI elements that are blurred until a proximity event is detected. The blurting of UI elements may be a diminishing visual treatment that may be an indication to a user to ignore the content. In some implementations, an inactive proximity layer may include UI elements that are minimized (e.g., about 8 pixels by 8 pixels) and/or of a particular low opacity (e.g., about 30 percent opaque). In some implementations, an active proximity layer may also include UI elements with the above-described diminishing visual treatments if, for example, those particular UI elements were not being viewed, selected, or expanded to provide the auxiliary data associated with the particular UI element.

The occlusion plane 308 is configured to show, hide, or diminish in size or shape one or more UI elements. In this example, the occlusion plane 308 is enabling the rendering of an expanded UI element 326. In this example, the occlusion plane 308 may be hiding or obfuscating any number of other UI elements (not shown) that do not trigger an indication that the user/mobile device within a threshold distance of a particular hidden UI element.

The proximity layer 310 is the active proximity layer. Layer 310 includes an expanded UI element 328. The UI element 328 depicts information that may be inserted as AR content into a scene of a physical space represented on a mobile device. The AR content in his example includes information about bus schedule timing for traveling to Market Street and Laguna Street and North Point-Van Ness Street.

In general, an active proximity layer is displayed to the user in an expanded view. In some implementations, the UI elements will be expanded so the user can view AR content associated with each respective element. The user may select upon, interact with, or otherwise access the AR content by selecting, moving, sailing, pinching, tapping, etc. on the AR content. In some implementations, the user 102 may perform a slide gesture or a pinching gesture on a screen of mobile device 106 over the expanded UI elements while the AR content associated with the UI elements in the active proximity layer is being displayed. In such an example, the active proximity layer may fade or be removed from the screen into a collapsed mode within its proximity layer. In addition, the UI element 326 may revert to a smaller shape, similar to UI element 318, for example. In some implementations, placing a UI element 326 in a collapsed mode may also blur the UI element 326 to provide the user a sense of focus while continuing to walk and interact with the rest of the scene representing the physical space.

When the active proximity layer 310 is collapsed, another proximity layer may be selected and presented as the active proximity layer, including any AR content associated with UI elements in the new active proximity layer. In some implementations, one or more UI elements are expanded in the new active proximity layer. Additional information may be presented for the one or more UI elements that expanded in the new active proximity layer. The user may continue swiping and/or otherwise interacting with UI elements in their respective (e.g., target) proximity layers to collapse and expand UI elements. For example, the user at continue to move toward inactive proximity layer 312, which would trigger layer 312 to become the active proximity layer when system 200 detects that the user (e.g., mobile device 106) is within a threshold distance of a location or object in the physical space, which corresponds to UI element 330, for example. UI element 330 would then expand to depict information and/or AR content associated with the location or object. The active proximity layer 310 would also become inactive when layer 312 becomes active. Similarly, the inactive background proximity layer 314 may become active as the user moves toward a physical object or physical location representing UI element 332, for example. The AR content associated with UI element 332 may then be presented to the user in the screen of the mobile device 106.

In some implementations, expanded UI elements may trigger a camera feed zoom in on the mobile device display as the UI element is expanded. This zoom in may function to indicate a forward movement in the physical space for the user.

In some implementations, the UI element generator 206 may generate a proximity layer 302 by accessing distances between particular UI elements. For example, if the UI elements 316, 318, and 320 are determined to be within a threshold distance from each other (in the corresponding physical space representing objects or locations associated with the UI elements 316, 318, and 320), then the system 200 may determine to place the UI elements 316, 318, and 320 in the same proximity layer 302. In this example, the system 200 may retrieve depth data 225 associated with images for a scene. The depth data 225 may be used to determine that UI element 322 and 324 were outside of the threshold distance. In some implementations, the threshold distance may be about one foot. In some implementations, the threshold distance may be about one to about five feet. In some implementations, the threshold distance may be about four feet to about ten feet. In general, the threshold distance may be programmable based on a total distance represented in a particular scene. For example, the further away a location is to a user, the larger the threshold distance interval may be.

Figure 4A:
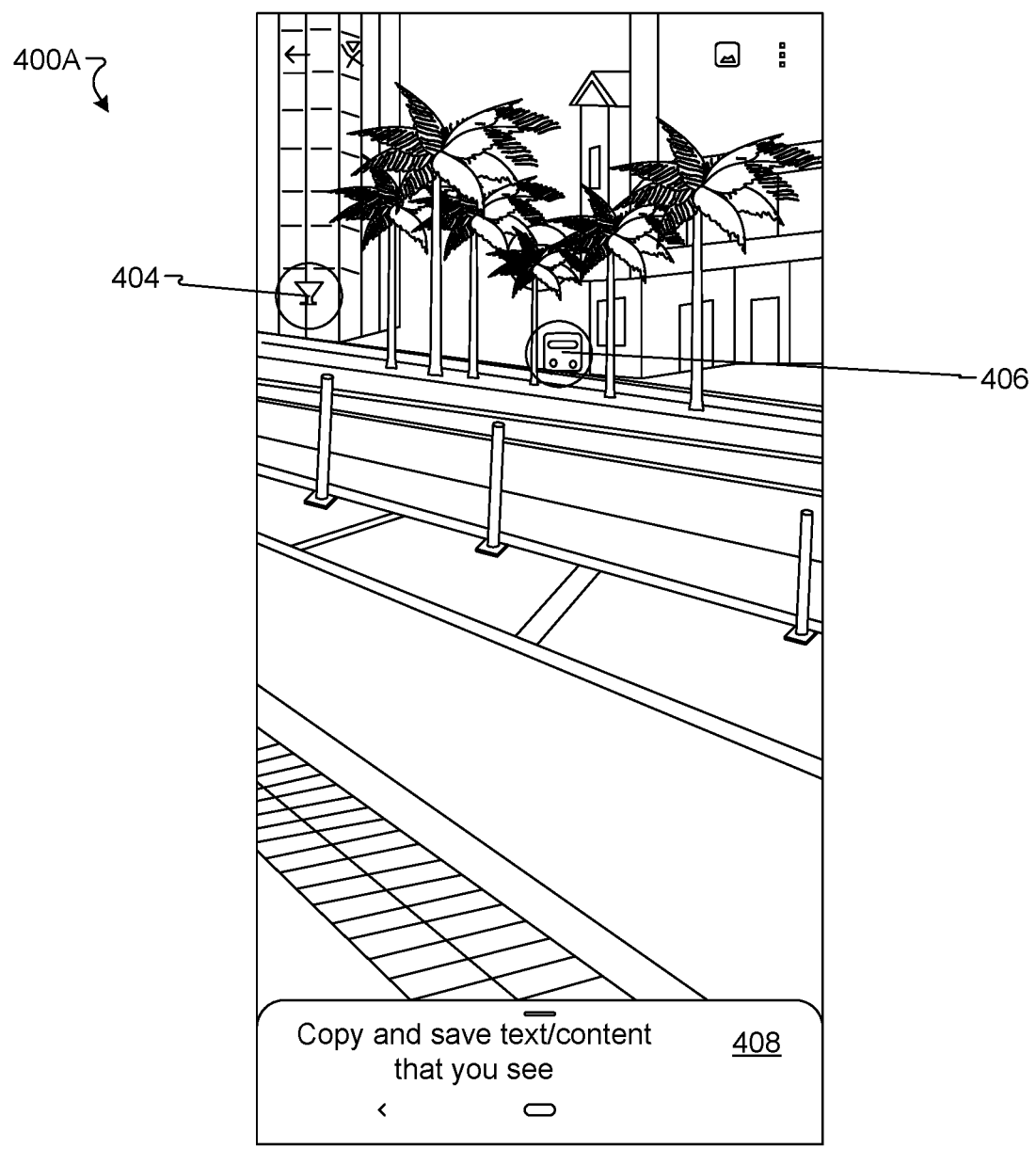
FIGS. 4A-4C illustrate AR content populated within a scene based on one or more of the layers of FIG. 3.

FIG. 4A illustrates AR content populated within a scene based on one or more of the layers of FIG. 3. System 200 may display any number of UI elements (e.g., AR content) over their associated real-world objects and/or locations in the physical space in a live camera feed from an AR-enabled device, such as mobile device 106. These real-world objects and/or locations may then be categorized by the system 200 into proximity layers. Such layers are expanded or collapsed by system 200 as the mobile device 106 is brought nearer to or farther from each respective real-world object and/or location in the physical space. Thus, system 200 exposes the interactivity of depth-dense UI elements in usable slices (i.e., using the proximity layer architecture). The slices may be displayed to the user in a way which is visually and gesturally intuitive, thereby providing an advantage over conventional systems that provide AR content.

As shown in FIG. 4A, the user may be operating mobile device 106 and accessing AR content via AR application 224 to render scene 400A. The camera may be providing an image feed on the display of the mobile device 106, as shown by scene 400A. The system 200 may also assess and provide particular UI elements pertaining to AR content available to the user. The AR content may indicate information for the user to view and select upon. The system 200 assesses the UI elements available within the view of the camera feed/scene 400A. The assessment may include determining, for each UI element, a proximity layer in which to assign the respective UI element.

In the depicted scene 400A, the system 200 determined that a first UI element 404 and a second UI element 406 are available. In this example, the system 200 is showing both UI elements 404 and 406 as selectable icons that indicate what information may lie within each UI element. For example, the first UI element 404 indicates that drinks are available for purchase at the location corresponding to icon/UI element 404. The second UI element 406 indicates that a bus stop is located at the location corresponding to icon/UI element 406.

The system 200 may provide and update instructions and/or directions associated with particular UI elements in the scene 400A. For example, instructions 408 indicate that the user may copy and save text or other content in the scene.

At some point, the user accessing mobile device 106 may indicate that the bus route indicated by UI element 406 is of interest. The user may select the icon representing element 406 to be provided (e.g., displayed) additional information (e.g., additional AR content) associated with the bus route. The underlying architecture (e.g., system 200) providing the UI elements 404 and 406 and scene 400A may receive a user gesture and may collapse or expand a proximity layer if the user moves toward a particular UI element. In response to user selection of UI element 406, the system 200 may zoom in on the UI element 406 while expanding additional information available about the physical location associated with UI element 406.

Figure 4B:
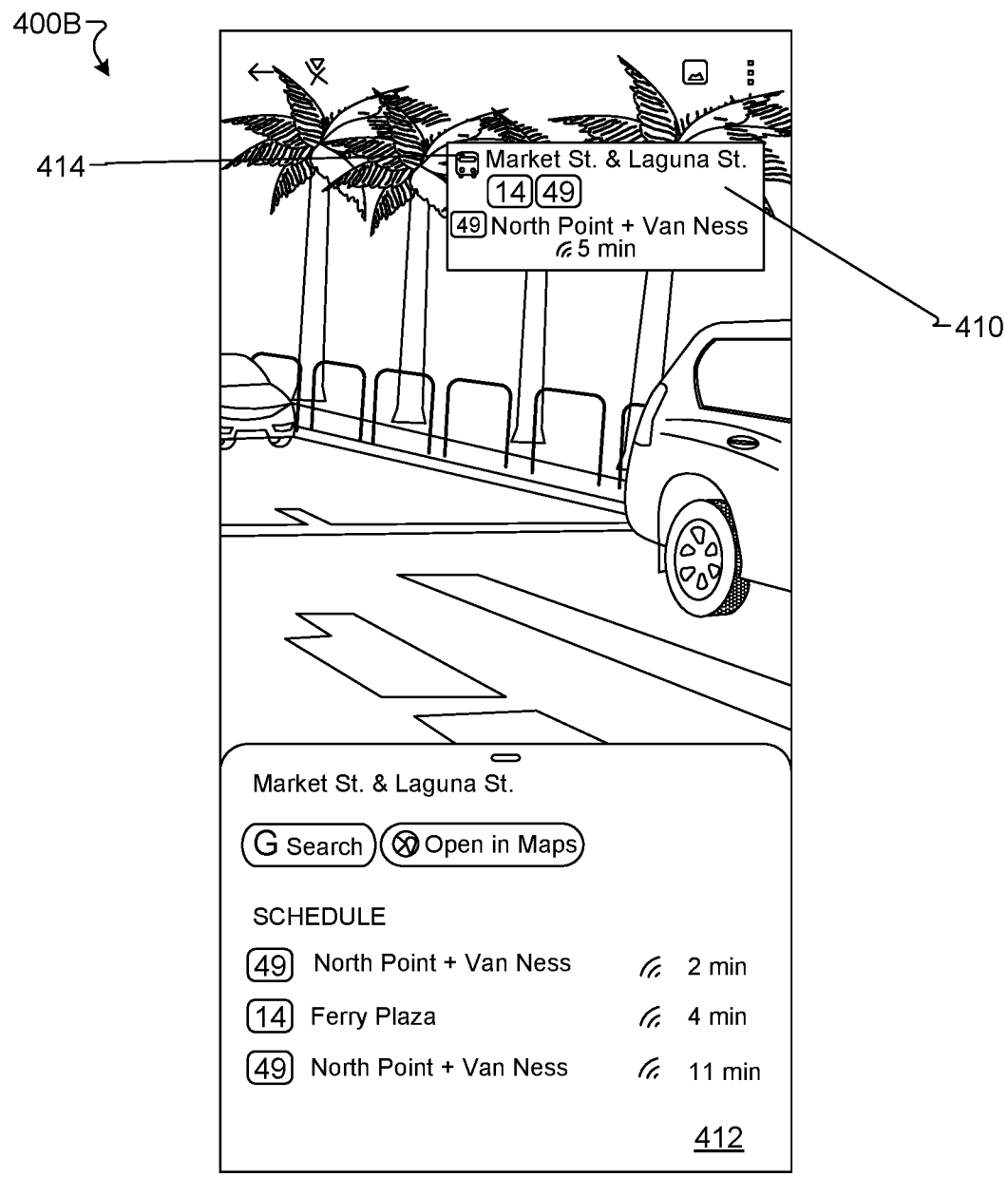

FIG. 4B illustrates zoomed in UI content/AR content populated within a scene 400B on mobile device 106, based on selection of UI element 406 in FIG. 4A. Here, the scene 400A has been updated/modified to scene 400B based on the selection. Because the user selected upon the UI element 406, the system 200 provided additional information 410 about the bus route associated with UI element 406. When a user either gestures (e.g., with a vertical swipe, a pinch gesture, etc.) or otherwise interacts with a UI element, the camera view zoom may change. The active/inactive state of proximity layers may also change if the user moves into a location associated with a different proximity layer than the proximity layer the user resided in before selecting UI element 406. In addition, the collapsed/expanded state of UI elements may change as the user selects or moves within the physical space (detected by movement of the mobile device 106). Other visual effects may occur to assist the user in understanding a context or information being presented on mobile device 106.

In the example depicted in FIG. 4B, the user is provided additional address information 410 at the location of the UI element 406, which is now expanded. If the user further interacts with the additional information 410, the system 200 may also provide additional information in another area of the UI shown on mobile device 106. For example, the user is shown additional links and content in area 412 in response to selecting the 14/48 icons 414. Transitional animations may also be provided to communicate what is happening with the AR content as it changes to further assist the user.

In some implementations, user gestures or UI interactions may result in either a zoom in or a zoom out. When the user triggers a zoom in, the camera view may zoom in and depict the zoom in on the mobile device 106. In addition, the UI elements in the active proximity layer may collapse and the active proximity layer may then become inactive while the next proximity layer in depth becomes active. When the next proximity layer in depth becomes active, the UI elements associated with that proximity layer may be expanded.

Visual effects can accompany this user interaction. For example, UI elements in proximity layers closer in depth to the active proximity layer may blur. When a user triggers a zoom out, the camera view may zoom out and depict the zoom out on the mobile device 106. Upon zoom out, the active proximity layers UI elements collapse and the active proximity layer becomes inactive while the next closest proximity layer in depth becomes active and its UI elements are expanded.

Figure 4C:
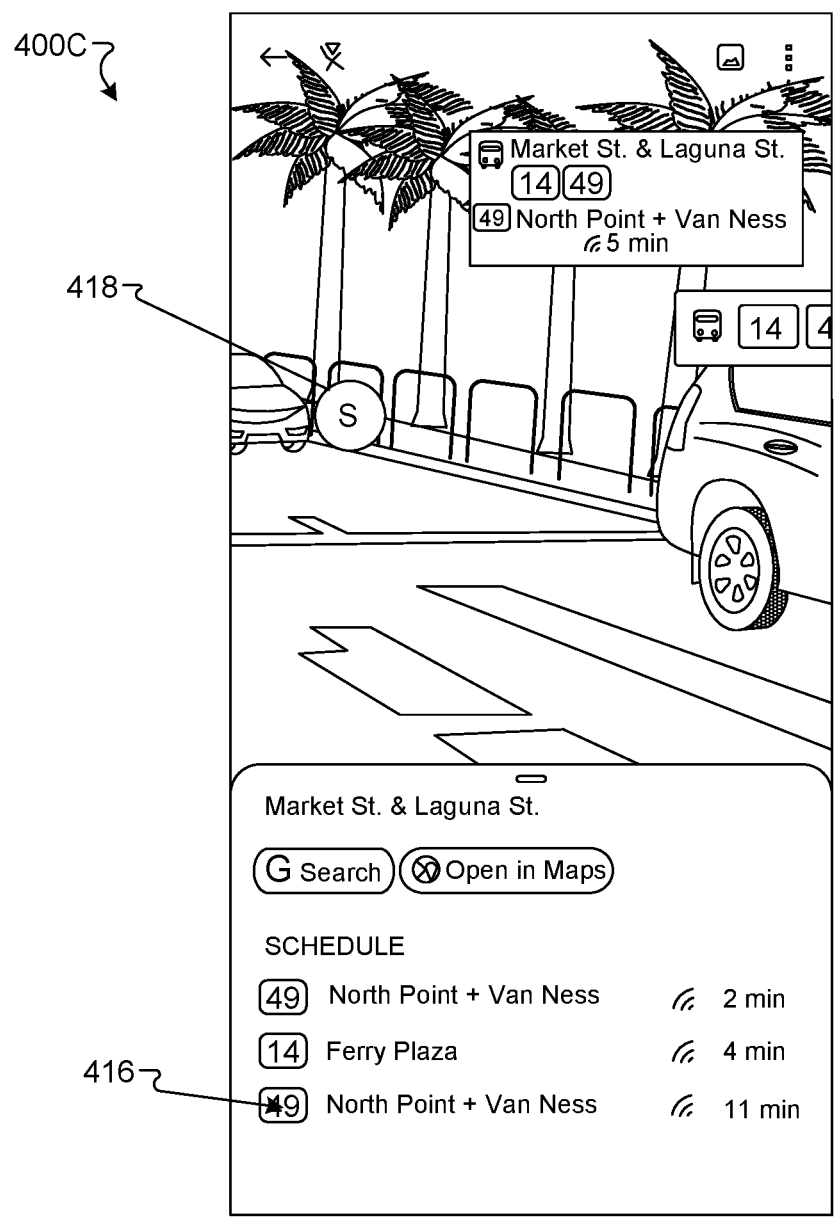

FIG. 4C illustrates zoomed in UI content populated within the AR environment on mobile device 106, based on additional selections of content provided in FIG. 4B. Here, the scene 400B has been updated to scene 400C based on the selections. For example, the user may have indicated that route 48 was of interest by selecting the route 416 to receive an estimated bus time arrival. The user may also begin walking toward the bus stop indicated by UI element 406 (FIG. 4A). In response, the system may begin providing additional information and other UI elements that may be within a threshold distance of the user. For example, the mobile device 106 may be nearing a scooter rental close to the user at UI element 418. The system 200 may determine that the user is interested in transportation based on selection of the bus route information and may respond by providing additional transportation services available in the area. In this example, the scooter rental may have recently become available (i.e., another user ended a rental session within the threshold proximity to the user). In response, the system 200 presented the UI element 418 for consumption by the user. As the user moves closer to the scooter rental indicated by UI element 418, the current active proximity layer may collapse and a new proximity layer may be indicated as active.

In some implementations, particular UI elements (e.g., AR objects) may be displayed to a user based on a context or relevance associated with the user. For example, if the user is looking for transportation options, additional transportation UI elements may be displayed to the user in the screen of the mobile device.

In some implementations, the system 200 may depict icons (e.g., bus icon in UI element 406 of FIG. 4A) rather than generic content (e.g., circle UI element 504 in FIG. 5A) based on a determination that the user may be looking for specific locations, objects, or information.

Figure 5A:
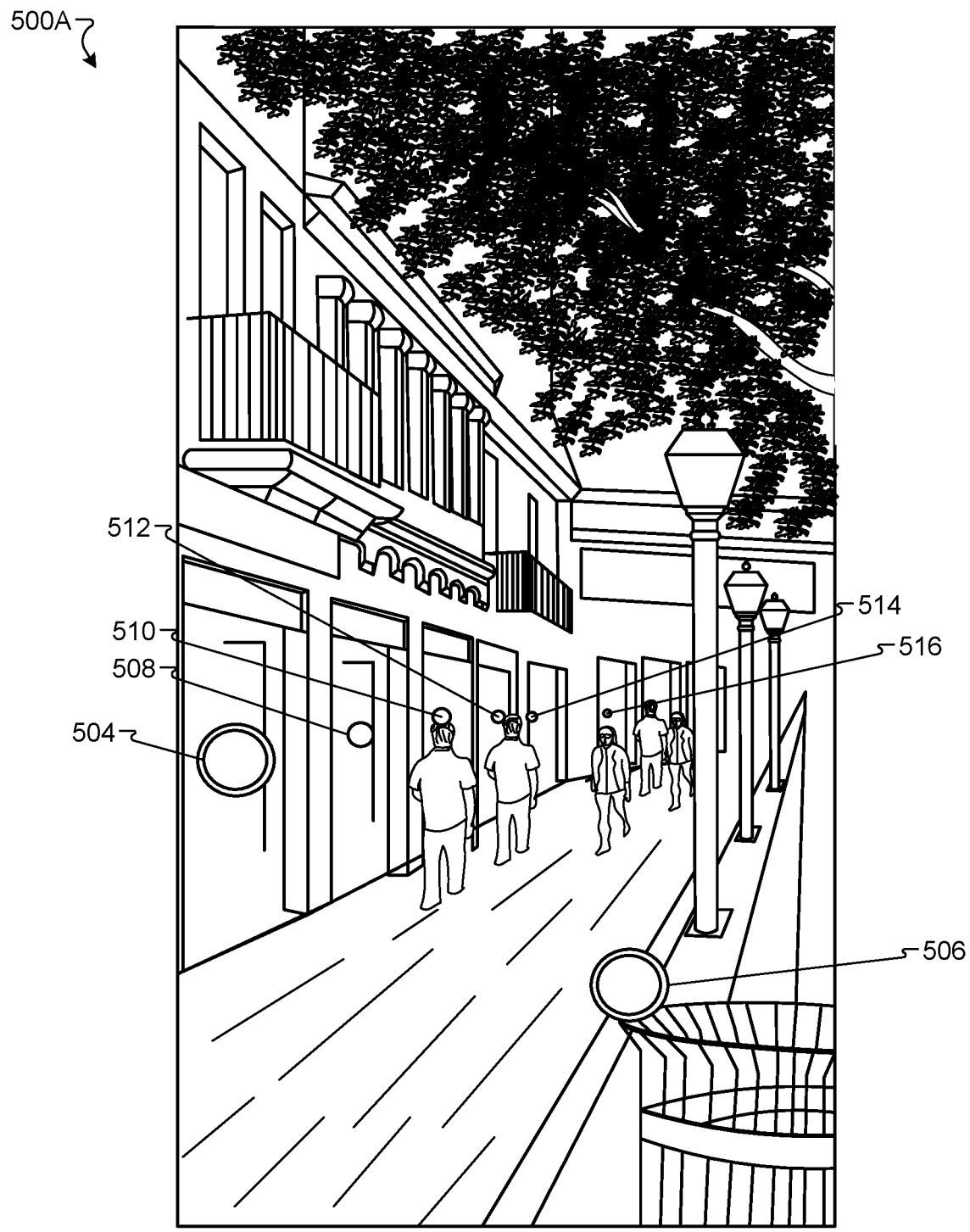
FIGS. 5A-5B illustrate AR content populated within a scene and gestural interaction with such AR content, in accordance with implementations described herein.

FIG. 5A illustrates AR content populated within a scene 500A and gestural interaction with such AR content. The scene 500A may be rendered on mobile device 106, for example. System 200 may display any number of UI elements (e.g., AR content) over their associated real-world objects and/or locations in the physical space in a live camera feed from an AR-enabled device, such as mobile device 106. These real-world objects and/or locations may then be categorized by the system 200 into proximity layers. Such layers are expanded or collapsed by system 200 as the mobile device 106 is brought nearer to or farther from each respective real-world object and/or location in the physical space.

As shown in FIG. 5A, the user may be operating mobile device 106 and accessing AR content via AR application 224. The camera 241 may be providing an image feed on the display of the mobile device 106, as shown by scene 500A. The system 200 may also assess and provide particular UI elements pertaining to AR content available to the user. The AR content may indicate information for the user to view and select upon. The system 200 assesses the UI elements available within the view of the camera feed/scene 500A. The assessment may include determining, for each UI element, a proximity layer in which to assign the respective UI element.

In the depicted scene 500A, the AR content includes at least UI element 504, UI element 506, UI element 508, UI element 510, UI element 512, UI element 514, and UI element 516. The UI elements 508-516 are in an inactive proximity layer. The UI elements 504 and 506 are in an active proximity layer and as such, are shown largest in the scene 502. The system 200 assessed UI elements 504 and 506 and determined that both elements 504 and 506 belong in a proximity layer together. For example, the system 200 may determine that locations/objects corresponding to the UI elements 504 and 506 are within a predetermined threshold distance apart and thus belong grouped into the same proximity layer.

The UI elements 508-516 are each in different proximity layers. The system may have determined that each of the UI elements 508-516 were far enough apart to not share a proximity layer. In addition, since the UI elements 508-516 are farther from the elements 504 and 506 (and the user/mobile device 106), the system 200 may have indicated that UI elements 508-516 should be represented as smaller elements. Thus, each UI element from the user to the end of the sidewalk in the scene 500A is smaller than the previous UI element. The size of the element may indicate to the user that the information associated with the UI element pertains to a location or object that is farther from the user than another larger UI element.

At some point, the user may wish to interact with a UI element. The user may select any of the UI elements depicted in a scene. For example, if the user selects a UI element in an inactive proximity layer, the system 200 may modify the scene (not shown) to zoom to the location in the scene associated with the selected UI element. If instead the user selects a UI element in the active proximity layer (e.g., element 504 or element 506), the system 200 may provide additional information.

Figure 5B:

FIG. 5B illustrates additional information (e.g., AR content) populated within a scene 500B in response to the user selecting UI element 504. For example, the user may swipe upward with their finger (or pinch or otherwise select to move forward into or near UI element 504). In response, the system 200 may display additional AR content, such as AR content 520 indicating that UI element 504 is a coffee shop, among other information. Here, the camera feed (e.g., view) provided to the user in mobile device 106 may be zoomed in from scene 500A.

If the user continues to walk down the sidewalk with mobile device 106, the current proximity layer and any associated UI elements may collapse and blur. A next closest proximity layer may be indicated as active thereby expanding UI elements associated with that proximity layer. Similarly, the user may simply zoom in on the mobile device 106 to view additional content and/or UI elements, rather than move closer to physical objects in the physical space and UI elements in the virtual space.

Figure 6A:
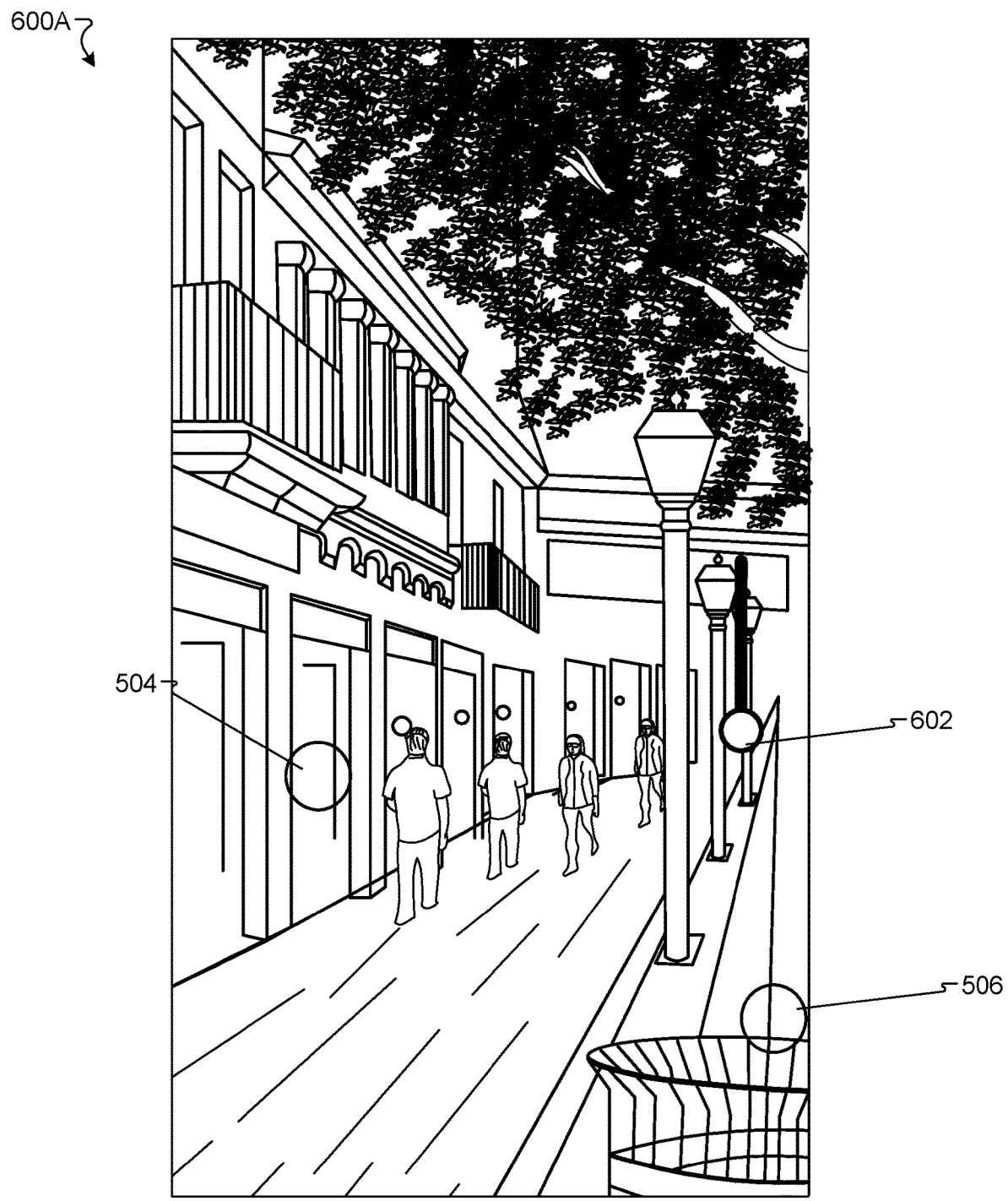
FIGS. 6A-6B illustrate AR content populated within a scene and UI interactions with such AR content, in accordance with implementations described herein.

FIG. 6A illustrates AR content populated within a scene 600A and UI interactions with such AR content, in accordance with implementations described herein. Similar to FIG. 5A, the scene 600A may be rendered on mobile device 106. System 200 may display any number of UI elements (e.g., AR content) over their associated real-world objects and/or locations in the physical space in a live camera feed from an AR-enabled device, such as mobile device 106. These real-world objects and/or locations may then be categorized by the system 200 into proximity layers. Such layers are expanded or collapsed by system 200 as the mobile device 106 is brought nearer to or farther from each respective real-world object and/or location in the physical space.

As shown in FIG. 6A, the user may be operating mobile device 106 and accessing AR content via AR application 224. The camera 241 may be providing an image feed on the display of the mobile device 106, as shown by scene 600A. The system 200 may also assess and provide particular UI elements pertaining to AR content available to the user. The AR content may indicate information for the user to view and select upon. The system 200 assesses the UI elements available within the view of the camera feed/scene 600A. The assessment may include determining, for each UI element, a proximity layer in which to assign the respective UI element.

In the depicted scene 600A, the AR content includes at least UI element 504 and UI element 506, as also depicted in FIG. 5A. Additional UI elements are also shown similar to FIG. 5A. In the scene 600A, the user is presented a slider tool 602. The user may drag the slider tool 602 upward to traverse in depth in the scene 600A.

Figure 6B:
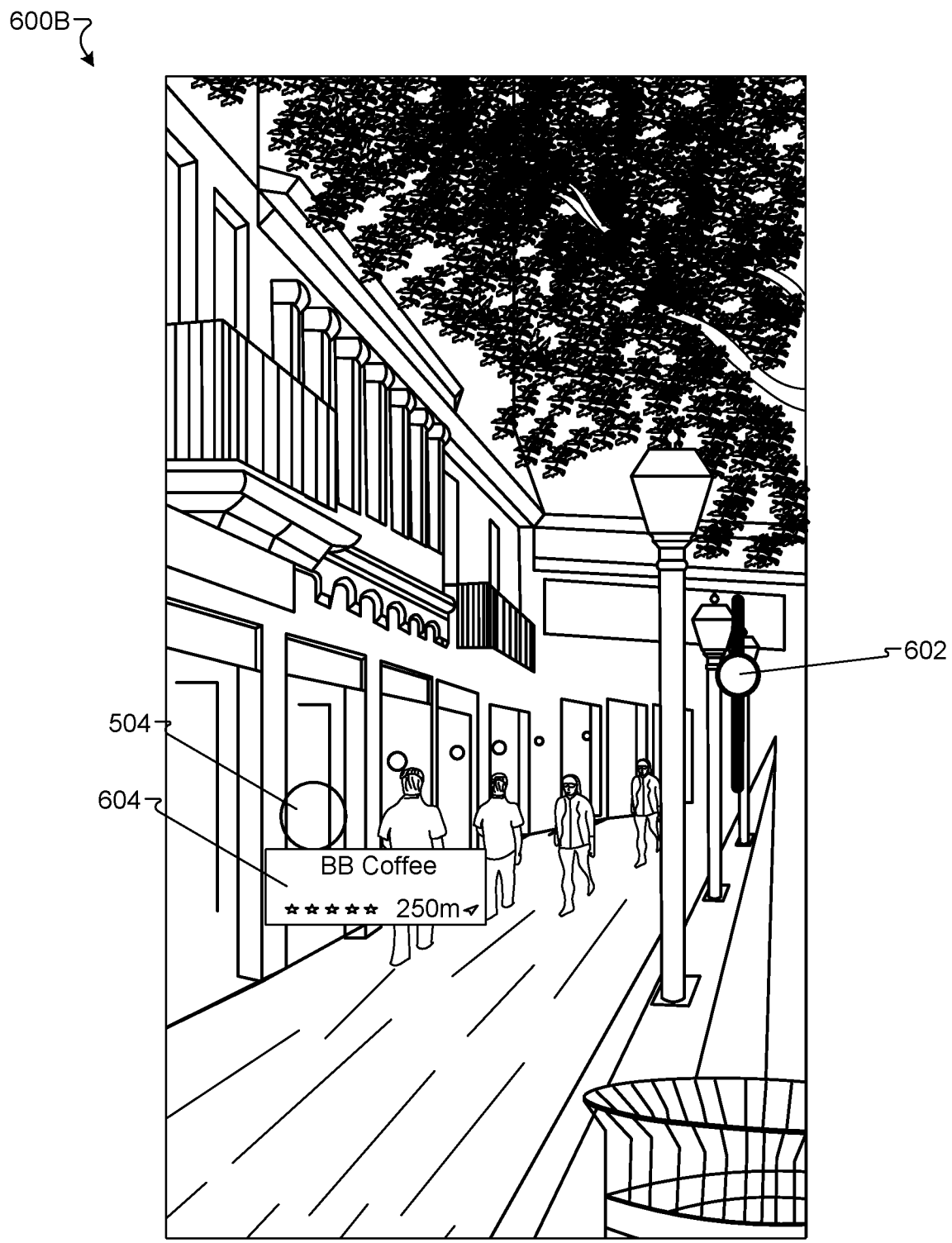

For example, if the user selects the slider tool 602 and drags upward, the system 200 may modify the scene (not shown) to zoom to the location in the scene associated with the selected location on the slide tool 602. As shown in FIG. 6B, the user moved the slide tool 602 upward. The system 200 zooms the camera view, the current layer's UI elements collapse and blur or disappear (in the case of UI element 506), and the next UI elements expand (element 504 now depicts additional AR content 604 detailing information about the physical location captured in the scene 600B. Here, the camera feed (e.g., view) provided to the user in mobile device 106 may be zoomed in from scene 600A.

If the user continues to walk down the sidewalk with mobile device 106, the current proximity layer and any associated UI elements may collapse and blur. A next closest proximity layer may be indicated as active thereby expanding UI elements associated with that proximity layer.

FIG. 7 is a flow chart diagramming an implementation of a process to generate a plurality of UI layers to provide an augmented reality (AR) experience, in accordance with implementations described herein. In this example, the plurality of UI layers may pertain to stacked (e.g., hierarchical) proximity layers that are generated by system 200 and triggered for display upon detecting events at the mobile device near a respective (e.g., target) proximity layer. The process 700 is described with respect to an example implementation at the electronic device of system 200 in FIG. 2, but it will be appreciated that the method can be implemented at systems having other configurations.

At block 702, the process 700 may include obtaining (e.g., receiving) depth data associated with at least one scene captured by the electronic device. For example, the camera 241 may capture one or more scenes surrounding a user accessing an electronic device of system 200 (e.g., mobile device 106). The scene(s) may be rendered for view by the user. The scenes may include physical locations and physical objects captured by the camera 241. In addition, the system 200 may place AR objects and/or other AR content over the physical locations and physical objects in the scenes. The user may peruse the AR content by motioning gestures on the electronic device or by moving the mobile device (e.g., while walking, etc.) through the physical environment surrounding the user.

At block 704, the process 700 may include obtaining (e.g., receiving) location data associated with a plurality of physical locations or physical objects within a predetermined distance of the electronic device. For example, the electronic device of system 200 may utilize GPS 240, image sensors 236, depth sensors 238, and any or all of tracking system 220 to obtain (e.g., receive) location data. The location data may include actual GPS coordinates, maps, depth data 239, coordinates, and/or other location-based data about the physical locations and/or physical objects.

At block 706, the process 700 may optionally include obtaining (e.g., receiving) auxiliary data associated with at least a portion of the physical locations or physical objects within the predetermined distance of the electronic device of system 200. For example, system 200 may determine which physical locations and/or physical objects are within a predetermined distance of the electronic device. Such locations and objects may be indicated as proximate enough to the user that the user may wish to view details about the locations and objects. In some implementations, the auxiliary data may be obtained as a particular proximity layer is approached by the user.

At block 708, the process 700 may include generating a plurality of augmented reality (AR) objects configured to be displayed over the portion of the physical locations or physical objects in the at least one scene. The AR objects represent the UI elements described throughout this disclosure. The UI elements (i.e., the AR objects) are configured to provide access to a version of the location data and the auxiliary data corresponding to the respective physical location or physical object in the portion. For example, the system 200 may determine location data that may be useful to display to the user on a mobile device, while not displaying actual coordinates or location data that is not user-friendly, or simply too encumbering to display on a mobile device screen. Thus, the version of the location data and the auxiliary data may be a condensed and formatted version of the actual data.

At block 710, the process 700 may include generating a plurality of proximity layers corresponding to the at least one scene. The proximity layers may function to display AR objects and auxiliary and/or location data at a convenient time for the user without overcrowding and inundating the user with overlapping content. Generating the proximity layers may include determining a distance between each AR object. For example, the system 200 may use the location data to determine distances between particular AR objects (e.g., UI elements). The distances and the obtained depth data 239 may be used to determine which AR objects belong in which proximity layer of the at least one scene. The distance may then be used to distribute each AR object into one of the plurality of proximity layers.

In some implementations, generating the plurality of proximity layers further includes determining an overlap in two or more of the plurality of AR objects, distributing the overlapped two or more of the plurality of AR objects into a single proximity layer in the plurality of proximity layers, and adjusting placement of the two or more of the plurality of AR objects when the single proximity layer is indicated as active and the two or more AR objects are simultaneously triggered for display. This can ensure that users are not provided AR objects (e.g., UI elements) that are difficult to select because of crowding, overlapping, etc.

At block 712, the process 700 may determine whether or not an indication of traversal of the scene is detected. If such an indication is not detected by system 200, the system 200 may retain (e.g., store, save) the current proximity layer view for the user, at block 714.

If system 200 instead detects an indication on the electronic device to traverse at least one of the scenes, the system 200 may display (e.g., cause display, trigger display) auxiliary data corresponding to AR objects associated with the particular proximity layer triggered by the detected indication, at block 716. For example, the user of the electronic device may provide swipe, pinch, and/or other input to move toward at least one of the AR objects associated with a particular proximity layer. Similarly, the user of the electronic device may move toward at least one of the AR objects in the particular proximity layer and the system may detect the user movement (e.g., electronic device movement). For example, the particular proximity layer may be configured to trigger display of the some or all of the auxiliary data corresponding to particular objects associated with the particular proximity layer while suppressing, from view, AR objects associated with other proximity layers, in response to detecting the electronic device is moved to a location within a threshold distance from at least one of the AR objects associated with the particular proximity layer.

In response to detecting either indication of movement, the system 200 may select the particular proximity layer close to the user to trigger display of the auxiliary data corresponding to the AR objects associated with the particular proximity layer while suppressing AR objects associated with other proximity layers. In some implementations, the system 200 may display a portion of the auxiliary data.

In some implementations, the AR objects associated with other proximity layers are depicted in a collapsed state when suppressed. For example, the AR objects in a collapsed state may be dots, gleams, transparent, and/or otherwise diminished in size and content from an expanded state. An example of a collapsed UI object (e.g., AR object) is shown in FIG. 5A at UI elements 508, 510, and 512, just to name a few examples. In some implementations, the AR objects associated with a respective (e.g., target) proximity layer (indicated as active) are depicted in an expanded state when triggered for display. The expanded state may include enlarged UI elements, such as UI elements 504 and 506, as shown in FIG. 5A. Another example of an expanded state may include UI element 504 with additional information 520, as shown in FIG. 5B.

In some implementations, a particular proximity layer is indicated as active when triggered to display the auxiliary data corresponding to the AR objects. Such a proximity layer may be further associated with an occlusion plane. The occlusion plane may be configured to apply a reductive visual treatment to one or more AR objects in a portion of the other proximity layers that are located in a foreground between the occlusion plane and the camera of the electronic device. For example, any proximity layers that the user of the electronic device may have moved through (or moved beyond triggering of display) may be occluded by the occlusion plane. The occlusion may be full, partial, or diminution of content.

In some implementations, AR objects (e.g., UI elements) in a proximity layer may not be strictly coplanar. The AR objects may differ in depth by a particular tolerance. Therefore, at least a portion of the AR objects in a particular proximity layer of the plurality of proximity layers may be determined to be at a different depth in the scene than other of the AR objects distributed in the same proximity layer.

In some implementations, each AR object (e.g., UI element) in the plurality of AR objects (e.g., UI elements) represents an affordance configured to retrieve and provide the version of the location data and a version of the auxiliary data associated with each physical object or physical location. The amount of data depicted in the screen of the electronic device may be device-configured, user-configured, system-configured, and/or AR environment-configured.

In some implementations, particular AR objects (e.g., UI elements) may be depicted based on indications that the content associated with the UI elements are sponsored or popular, for example. Such indications may be scored and/or weighted in order to determine which available UI elements are to be displayed to a particular user.

In some implementations, particular thresholds for displaying UI elements (e.g., AR objects) may be based on an overlap threshold that is assessed when all UI elements (e.g., AR objects) are in an expanded state. If an overlap is determined, particular UI elements (e.g., AR objects) may be moved into other proximity layers or otherwise moved in the UI to accommodate full view of the content as the user moves near to each respective UI element (e.g., AR object).

Figure 8:
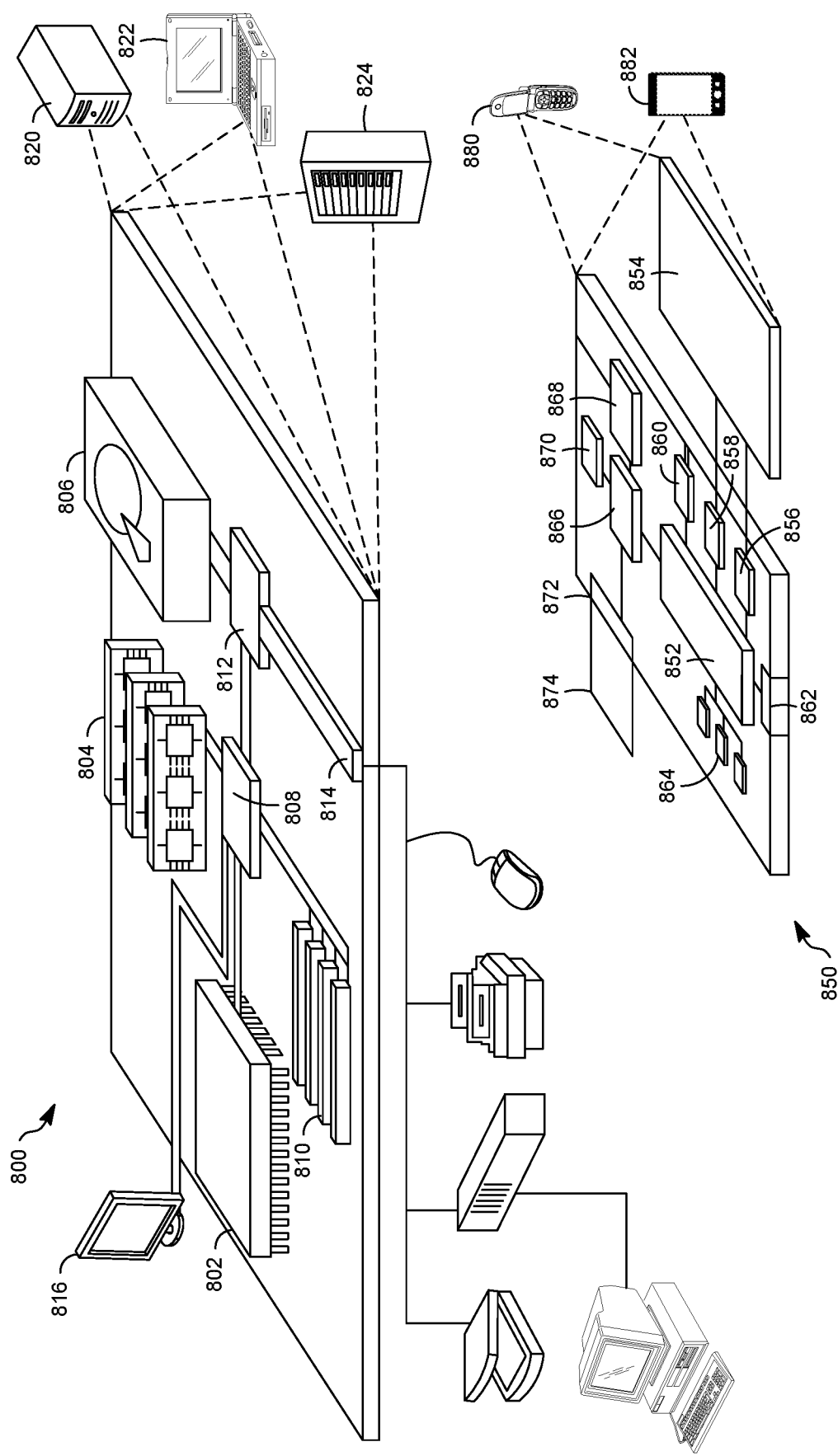
FIG. 8 illustrates an example of a computer device and a mobile computer device that can be used with the implementations described here.

FIG. 8 shows an example computer device 800 and an example mobile computer device 850, which may be used with the techniques described here. Features described with respect to the computer device 800 and/or mobile computer device 850 may be included in the system 200 described above. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MIMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Implementations of the various techniques described herein may be implemented in digital electronic circuitry, or in computer hardware, firmware, software, or in combinations of them. The various techniques described herein may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

The computing device according to example embodiments described herein may be implemented using any appropriate combination of hardware and/or software configured for interfacing with a user including a user device, a user interface (UI) device, a user terminal, a client device, or a customer device. The computing device may be implemented as a portable computing device, such as, for example, a laptop computer. The computing device may be implemented as some other type of portable computing device adapted for interfacing with a user, such as, for example, a PDA, a notebook computer, or a tablet computer. The computing device may be implemented as some other type of computing device adapted for interfacing with a user, such as, for example, a PC. The computing device may be implemented as a portable communication device (e.g., a mobile phone, a smart phone, a wireless cellular phone, etc.) adapted for interfacing with a user and for wireless communication over a network including a mobile communications network.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," "proximate," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 80 degrees or at other orientations) and the spatially relative descriptors used herein may be interpreted accordingly.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, all terms (including technical and scientific terms) used herein have the same meaning as commonly understood by one of ordinary skill in the art to which this present inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A method for providing an augmented reality (AR) experience on an electronic device, the method comprising:
    obtaining depth data associated with at least one scene captured by the electronic device;
    generating a plurality of augmented reality (AR) objects configured to be displayed in conjunction with a portion of a plurality of physical objects in the at least one scene and within a predetermined distance of the electronic device;
    generating a plurality of proximity layers corresponding to the at least one scene and distributing each AR object into one of the plurality of proximity layers based on a determined distance between the AR objects and the depth data associated with the at least one scene;
    detecting an indication on the electronic device to move within the at least one scene toward at least one of the plurality of AR objects associated a respective proximity layer; and
    in response to the detecting, triggering display in the respective proximity layer, auxiliary data corresponding to AR objects, from the plurality of AR objects, associated with the respective proximity layer while suppressing display of AR objects, from the plurality of AR objects, associated with other of the plurality of proximity layers.

2. The method of claim 1, further comprising:
    obtaining location data associated with the plurality of physical objects within a predetermined distance of the electronic device, and
    wherein each AR object is configured to trigger display of a version of the location data and the auxiliary data corresponding to the respective physical object in the portion.

3. The method of claim 2, wherein each AR object in the plurality of AR objects represents an affordance configured to retrieve and provide the version of the location data and the auxiliary data associated with each physical object or physical location.

4. The method of claim 1, wherein the respective proximity layer is further configured to trigger display of the auxiliary data corresponding to the AR objects associated with the respective proximity layer while suppressing AR objects associated with other of the plurality of proximity layers, in response to detecting the electronic device is moved to a location within a threshold distance from at least one of the AR objects associated with the respective proximity layer.

5. The method of claim 1, wherein:
    the AR objects associated with other proximity layers are depicted in a collapsed state when suppressed; and
    the AR objects associated with the respective proximity layer are depicted in an expanded state when triggered for display.

6. The method of claim 1, wherein the respective proximity layer is indicated as active when triggered to display the auxiliary data corresponding to the AR objects, the respective proximity layer being further associated with an occlusion plane configured to apply a reductive visual treatment to one or more AR objects in a portion of the other proximity layers that are located in a foreground between the occlusion plane and a camera of the electronic device.

7. The method of claim 1, wherein at least a portion of the AR objects in a proximity layer of the plurality of proximity layers are determined to be at a different depth in the scene than other of the AR objects distributed in the same proximity layer.

8. The method of claim 1, wherein generating the plurality of proximity layers further comprises:
    determining an overlap in two or more of the plurality of AR objects;
    distributing the overlapped two or more of the plurality of AR objects into a single proximity layer in the plurality of proximity layers; and
    adjusting placement of the two or more of the plurality of AR objects when the single proximity layer is indicated as active and the two or more of the plurality of AR objects are simultaneously triggered for display.

9. A system comprising:
    at least one processing device; and
    memory storing instructions that when executed cause the processing device to perform operations including:
        receiving depth data associated with at least one scene captured by an electronic device;
        generating a plurality of augmented reality (AR) objects configured to be displayed in conjunction with a portion of a plurality of physical objects in the at least one scene and within a predetermined distance of the electronic device;
        generating a plurality of proximity layers corresponding to the at least one scene wherein at least a portion of the AR objects in a proximity layer of the plurality of proximity layers are determined to be at a different depth in the scene than other of the AR objects distributed in the same proximity layer;
        detecting an indication on the electronic device to move within the at least one scene toward at least one of the plurality of AR objects associated with a target proximity layer; and
        in response to the detecting, triggering display in the target proximity layer, auxiliary data corresponding to AR objects, from the plurality of AR objects, associated with the target proximity layer while suppressing display of AR objects, from the plurality of AR objects, associated with other of the plurality of the proximity layers.

10. The system of claim 9, wherein generating the plurality of proximity layers includes:
    determining a distance between each AR object; and
    distributing each AR object into one of the plurality of proximity layers based on the determined distance and the depth data associated with the at least one scene.

11. The system of claim 9, wherein the target proximity layer is further configured to trigger display of the auxiliary data corresponding to the AR objects associated with the target proximity layer while suppressing AR objects associated with other proximity layers, in response to detecting the electronic device is moved to a location within a threshold distance from at least one of the AR objects associated with the target proximity layer.

12. The system of claim 9, wherein:
- the AR objects associated with other proximity layers are depicted in a collapsed state when suppressed; and
- the AR objects associated with the target proximity layer are depicted in an expanded state when triggered for display.

13. The system of claim 9, wherein the target proximity layer is indicated as active when triggered to display the auxiliary data corresponding to the AR objects, the target proximity layer being further associated with an occlusion plane configured to apply a reductive visual treatment to one or more AR objects in a portion of the other proximity layers that are located in a foreground between the occlusion plane and a camera of the electronic device.

14. The system of claim 9, wherein generating the plurality of proximity layers further comprises:
- determining an overlap in two or more of the plurality of AR objects;
- distributing the overlapped two or more of the plurality of AR objects into a single proximity layer in the plurality of proximity layers; and
- adjusting placement of the two or more of the plurality of AR objects when the single proximity layer is indicated as active and the two or more of the plurality of AR objects are simultaneously triggered for display.

15. A non-transitory computer-readable medium comprising instructions stored thereon that, when executed by at least one processor, are configured to cause a computing system to at least:
- receiving depth data associated with at least one scene captured by an electronic device;
- receiving location data associated with a plurality of physical objects within a predetermined distance of the electronic device;
- generating a plurality of augmented reality (AR) objects configured to be displayed in conjunction with a portion of a plurality of physical objects in the at least one scene and within a predetermined distance of the electronic device;
- generating a plurality of proximity layers corresponding to the at least one scene and distributing each AR object into one of the plurality of proximity layers based on a determined distance between the AR objects and the depth data associated with the at least one scene;
- detecting an indication on the electronic device to move within the at least one scene toward at least one of the plurality of AR objects associated with a target proximity layer; and
- in response to the detecting, triggering display in the target proximity layer, auxiliary data corresponding to AR objects, from the plurality of AR objects, associated with the target proximity layer while suppressing display of AR objects, from the plurality of AR objects, associated with other of the plurality of the proximity layers.

16. The computer-readable medium of claim 15, wherein the target proximity layer is further configured to trigger display of the auxiliary data corresponding to the AR objects associated with the target proximity layer while suppressing AR objects associated with other proximity layers, in response to detecting the electronic device is moved to a location within a threshold distance from at least one of the AR objects associated with the target proximity layer.

17. The computer-readable medium of claim 15, wherein the target proximity layer is indicated as active when triggered to display the auxiliary data corresponding to the AR objects, the target proximity layer being further associated with an occlusion plane configured to apply a reductive visual treatment to one or more AR objects in a portion of the other proximity layers that are located in a foreground between the occlusion plane and a camera of the electronic device.

18. The computer-readable medium of claim 15, wherein generating the plurality of proximity layers further comprises:
- determining an overlap in two or more of the plurality of AR objects;
- distributing the overlapped two or more of the plurality of AR objects into a single proximity layer in the plurality of proximity layers; and
- adjusting placement of the two or more of the plurality of AR objects when the single proximity layer is indicated as active and the two or more of the plurality of AR objects are simultaneously triggered for display.

* * * * *